United States Patent
Louis et al.

(10) Patent No.: US 6,308,723 B1
(45) Date of Patent: Oct. 30, 2001

(54) PIEZO-RESISTIVE POSITION INDICATOR

(75) Inventors: Ronald J. Louis, Phoenix, AZ (US); Reza Oboodi, Morris Plains, NJ (US)

(73) Assignee: AlliedSignal, Inc., Morris Township, NJ (US)

( * ) Notice: Subject to any disclaimer, the term of this patent is extended or adjusted under 35 U.S.C. 154(b) by 0 days.

(21) Appl. No.: 09/358,773

(22) Filed: Jul. 22, 1999

Related U.S. Application Data
(60) Provisional application No. 60/108,976, filed on Nov. 18, 1998.

(51) Int. Cl.[7] ................................................. F16K 37/00
(52) U.S. Cl. .................................... 137/1; 137/554
(58) Field of Search ......................... 137/554, 553, 137/1; 324/207.16, 207.19, 207.2

(56) References Cited

U.S. PATENT DOCUMENTS

| | | |
|---|---|---|
| 4,777,979 | 10/1988 | Twerdochlib . |
| 4,794,048 | 12/1988 | Oboodi et al. . |
| 5,048,343 | 9/1991 | Oboodi et al. . |
| 5,109,885 | 5/1992 | Tauscher . |
| 5,271,724 | 12/1993 | Van Lintel . |
| 5,293,900 | * 3/1994 | Karbassi et al. ................... 137/554 |
| 5,477,149 | 12/1995 | Spencer et al. . |
| 5,609,183 | 3/1997 | Parker . |
| 5,736,635 | 4/1998 | Onodera . |

FOREIGN PATENT DOCUMENTS

| | | |
|---|---|---|
| 42 28 307 A1 | 3/1994 | (DE) . |
| 2139 358 A | 11/1984 | (GB) . |

OTHER PUBLICATIONS

PCT/US99/27412 International Search Report.

* cited by examiner

*Primary Examiner*—Kevin Lee
(74) *Attorney, Agent, or Firm*—Keith Newburry, Esq.

(57) ABSTRACT

According to principles of the present invention, a sensor beam provides a linear or non-linear continuous signal to a computer that translates the signal into a valve position reading. In an illustrative embodiment of the invention, a sensor beam incorporating piezo-resistive components forming a Wheatstone bridge abuts a cam mounted on a butterfly valve spindle. Valve movement causes rotation of the cam that, in turn, imparts a bending moment to the sensor beam. This bending moment strains the piezo-resistive components, thereby altering the resistance of the Wheatstone bridge. The computer measures the resistance change using an output signal transmitted by the sensor beam and calculates valve position based thereon.

40 Claims, 6 Drawing Sheets

PIEZO-RESISTIVE POSITION INDICATOR

REFERENCE TO COPENDING APPLICATION

This application claims the benefit of U.S. Provisional Application No. 60/108,976 filed Nov. 18, 1998.

TECHNICAL FIELD

This invention relates generally to position sensing systems and in particular to a system for and method of detecting valve position.

BACKGROUND OF THE INVENTION

Fluid transfer systems, such as aircraft environmental control systems, extensively employ valves for delivery and regulation of engine bleed air for such purposes as passenger cabin pressurization and temperature control. Any failure of a valve to open or close will negatively affect environmental control system performance and, in some instances, affect aircraft dispatchability.

Although valve failures can sometimes be calculated via measurements of the temperature and pressure of the bleed air, such failure detection schemes tend to be elaborate and require significant testing and analysis to ensure adequate function. Further, implementation of algorithms needed for such calculations increase development costs, airplane down time and retrofit cost.

It is desirable to detect valve failure when the airplane is grounded and the systems are off. The preferred approach to valve failure detection is deterministic position indication through the use of valve position sensing instruments. With respect to such instruments, the position indicator, wiring, and interface circuit associated therewith, ideally, are cost effective, lightweight, interchangeable and able to operate in engine environments of severe vibration and temperature. Moreover, it is preferable to use a standardized design for all valve applications to achieve commonality and mass economy. Traditional position indicators such as limit switches and potentiometers are of low reliability due in large part to their incorporation of opening and closing electrical contacts. More reliable aerospace quality devices such as rotary variable transformers, rotary variable differential transformers and linear variable differential transformers are undesirably expensive. Eddy current sensors, Hall effect sensors, proximity sensors and other alternatives, such as optical switches, can operate only within a relatively small temperature range.

Accordingly, a need exists for an improved position indicator, the implementation and operation of which is simple, and the components of which are cost effective, lightweight, interchangeable and able to operate in extreme engine environments.

SUMMARY OF THE INVENTION

According to principles of the present invention, a sensor beam provides a linear or non-linear continuous signal to a computer that translates the signal into a valve position reading.

In one embodiment of the invention, a sensor beam incorporating piezo-resistive components forming a Wheatstone bridge abuts a cam mounted on a butterfly valve spindle. Valve movement causes rotation of the cam that, in turn, bends a beam causing strains in the piezo-resistive components, thereby altering the resistance of the Wheatstone bridge. The computer or the other electronic device measures the resistance change by means of an output signal transmitted by the sensor beam and calculates valve position based thereon.

BRIEF DESCRIPTION OF THE DRAWING

The invention will be better understood from a reading of the following detailed description taken in conjunction with the drawing figures in which like reference designators are used to designate like elements, and in which.

DETAILED DESCRIPTION OF PREFERRED EMBODIMENT

Oboodi, U.S. Pat. No. 4,794,048 ("'048 patent"), which issued on Dec. 27, 1988 and is assigned to AlliedSignal, Inc., is hereby incorporated by reference. This patent discloses a ceramic coated metal substrate for electronic applications.

Figure 1:
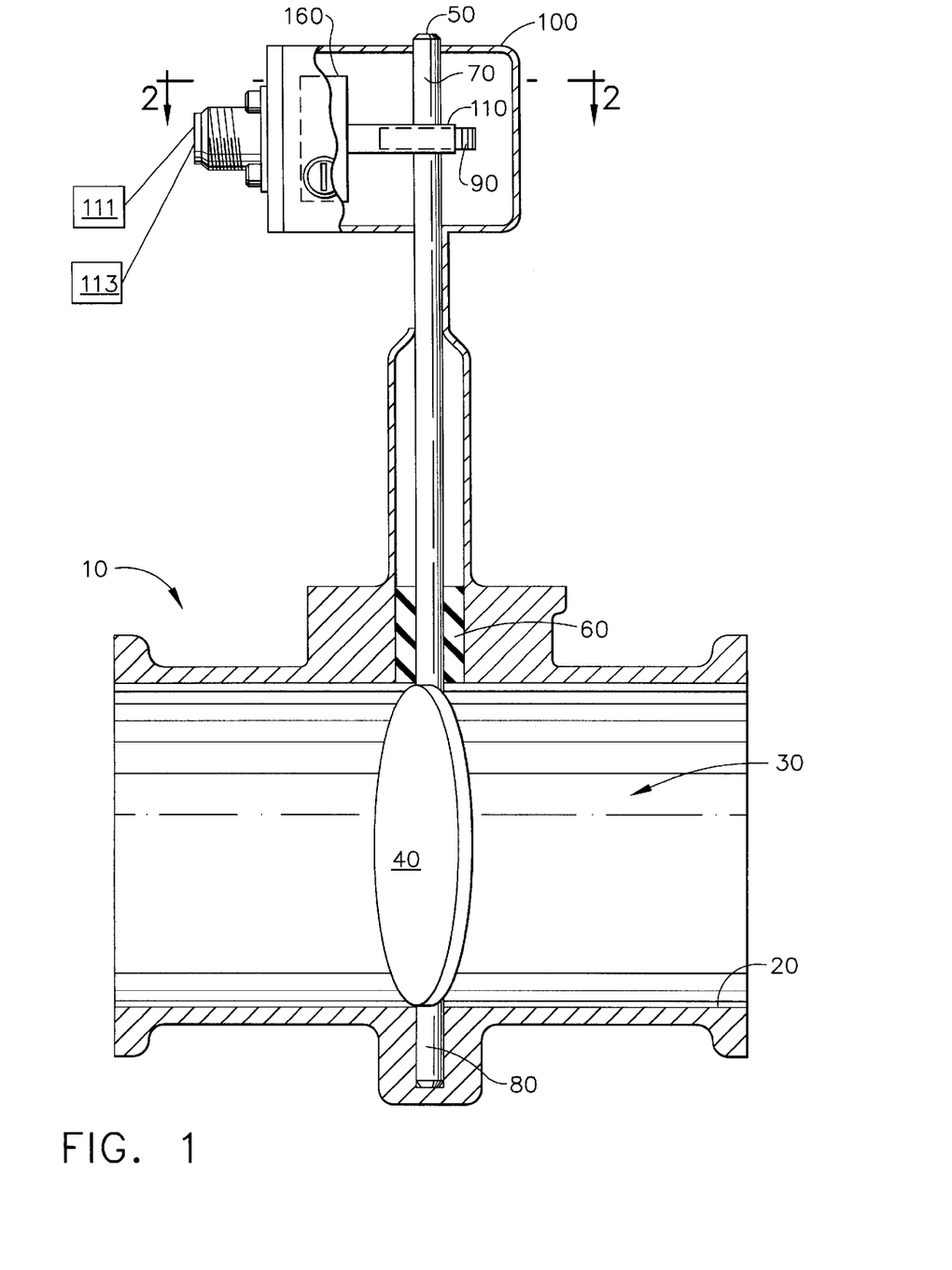
FIG. 1 is a cross-sectional view of a valve portion of an aircraft environmental control system incorporating features of the present invention.

FIG. 1 is a cross-sectional view of a valve portion of an aircraft environmental control system 10. Environmental control system 10 includes a pipe 20 through which fluid, such as air, may flow. The regulation of fluid flow through pipe 20 is controlled by a butterfly valve 30. Butterfly valve 30 comprises a valve member, such as a disk 40, which, in a closed position, blocks fluid flow through pipe 20, a drive spindle 50 and a dynamic seal, such as an elastomeric seal 60.

Valve disk 40 is caused to rotate by means of an actuator (not shown) connected to drive spindle 50, the rotational torque being transmitted to disk 40 by drive spindle 50. Disk 40 is drivably connected to a lower end 80 of drive spindle 50 and is free to rotate within pipe 20. When valve 30 is in the closed position, seal 60 engages the periphery of disk 40, thereby sealing off flow of fluid through pipe 20. Alternatively, seal 60 may be excluded such that no seal is created when valve 30 is in the closed position.

Figure 2A:
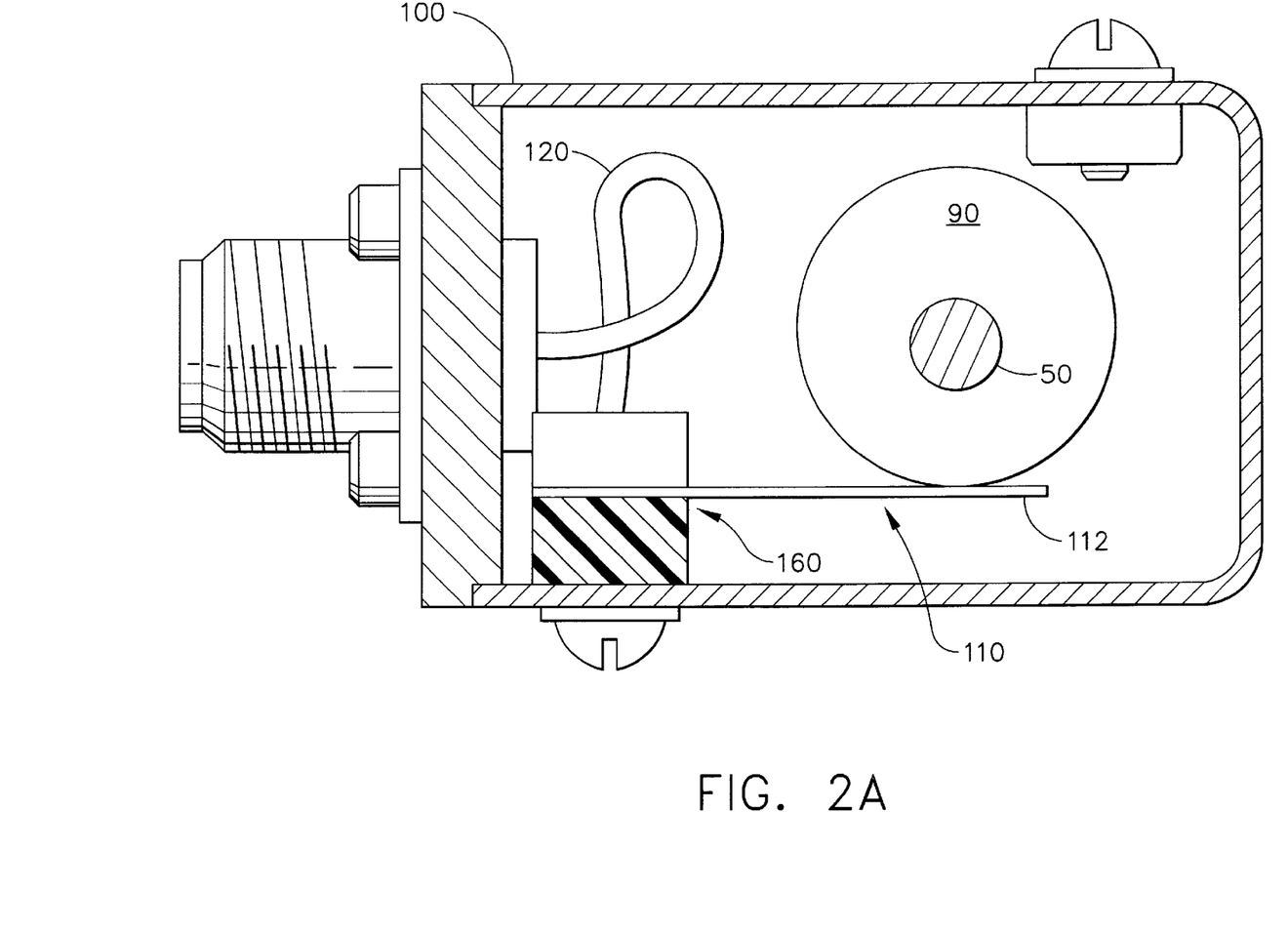
FIG. 2A is a cross-sectional view taken along Line 2—2 as depicted in FIG. 1.
Figure 2B:
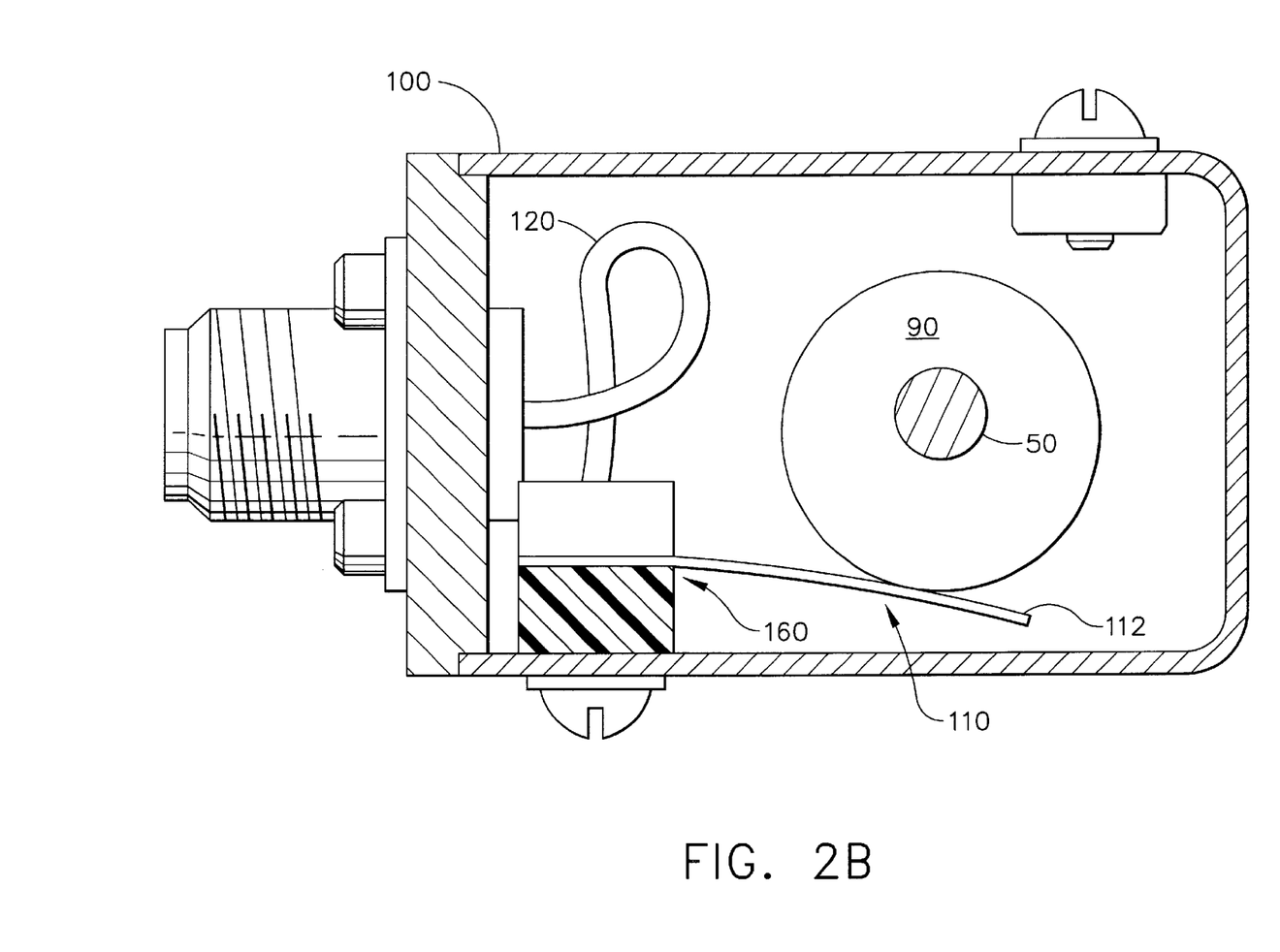
FIG. 2B is a view analogous to FIG. 2A depicting bending of a sensor beam by a cam according to principles of the present invention.

As shown in FIGS. 1, 2A and 2B, attached to upper end 70 of spindle 50 is an actuating member, such as a substantially oblong or elliptical cam 90, disposed within an enclosure 100 and depicted in FIG. 1 with broken lines. Alternatively, cam 90 is circular and eccentrically mounted on spindle 50. Cam 90 at all times rotates on spindle 50 coincidentally with rotation of disk 40. Cam 90 abuts a sensor beam 110 fixably mounted within enclosure 100 by means of a clamp 160. In the preferred embodiment, beam 110 comprises a thin sheet metal substrate having a first portion 112 extending outwardly from clamp 160. As is discussed in greater detail below, disposed upon beam 110 are piezo-resistive components, the resistance of which changes when strained, that are coated with and fixed by means of glass or ceramic. The advantages of constructing beam 110 in this manner are described in detail in the '048 patent. For example, the ceramics/glasses used in this invention have a high temperature refiring capability (>850° C.), and are air firable. Moreover, the preferred embodiment beam 110 exhibits a composite thermal coefficient of expansion which is optimum for use in electronic devices, and exhibits a low dielectric constant which allows for use with high frequency circuits and allows for greater applicability in electronic applications. Furthermore, the ceramics/glasses used in this invention exhibit strong adhesion to the metal substrate after firing and are very resistant to thermal stress. This avoids breakdown of beam 110 when exposed to high temperatures normally encountered in engine environments and/or the operation of electronic devices. Beam 110 electrically communicates an output signal through lead wires 120 to a computer or other display or read device represented by box 111 in FIG. 1.

Figure 3:
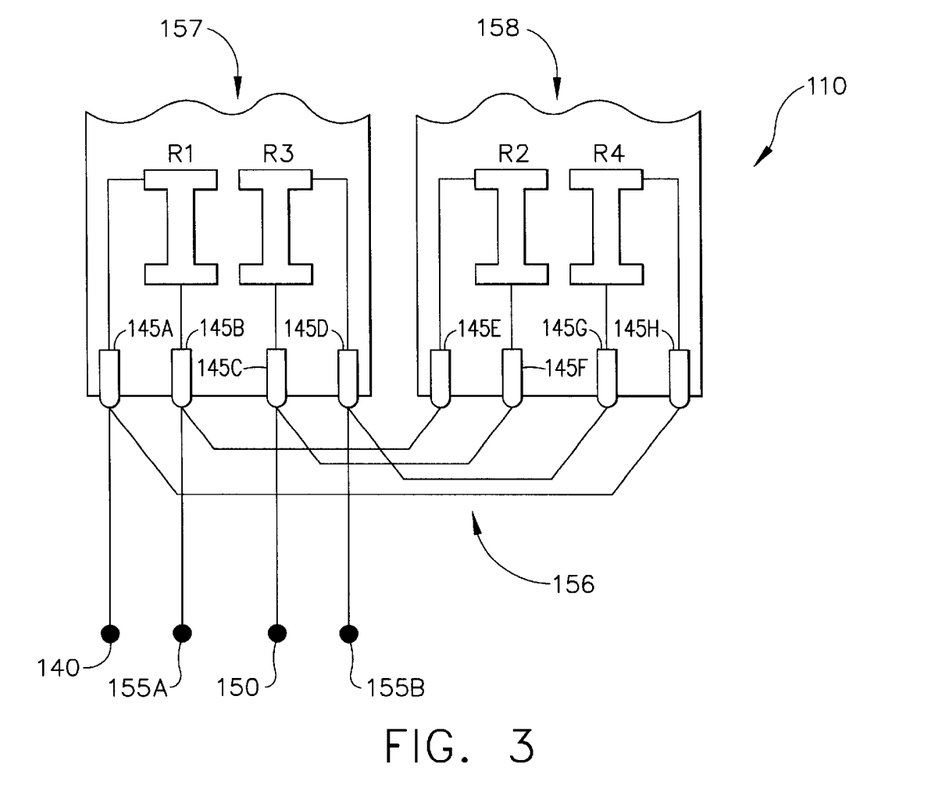
FIG. 3 is a partial split plan view of the top surface and bottom surface of a sensor beam incorporating features of the present invention.
Figure 4:
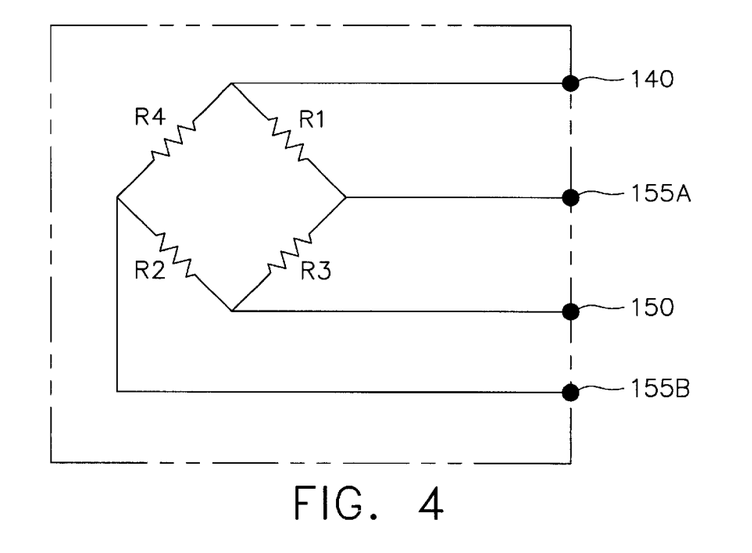
FIG. 4 is an electrical schematic depiction of a preferred embodiment piezo-resistive Wheatstone bridge incorporated by a sensor beam incorporating features of the present invention.

In the preferred embodiment, the arrangement of piezo-resistive components incorporated by beam 110 is such as to form a Wheatstone bridge, although other similarly functioning circuit configurations may be substituted. As shown in FIGS. 3 and 4, the Wheatstone bridge comprises an input 140, a ground 150, a pair of outputs 155A, 155B, eight terminals 145A, 145B, 145C, 145D, 145E, 145F, 145G, 145H, and four piezo-resistors R1, R2, R3, R4. As best illustrated by FIG. 3, piezo-resistors R1, R3 and terminals 145A, 145B, 145C, 145D are situated on top surface 157 of beam 110 and piezo-resistors R2, R4 and terminals 145E, 145F, 145G, 145H are situated on bottom surface 158 of beam 110. Through the use of a connector means 156, terminal 145A is electrically connected to terminal 145H, terminal 145B is electrically connected to terminal 145E, terminal 145C is electrically connected to terminal 145F, and terminal 145D is electrically connected to terminal 145G. Connector means 156 may be standard electrical wiring or any other similarly functioning device known in the art.

A continuous supply of input voltage from a voltage supply represented by 113 in FIG. 1 may be supplied to beam 110 through clamp 160 via input 140 and returns to outputs 155A, 155B as an output voltage or signal. The value of this output signal is a function of the effective resistance of beam 110 created by the Wheatstone bridge. Because beam 110 is fixed by clamp 160, as shown in FIGS. 2A and 2B, beam 110 behaves as a cantilever beam such that when first portion 112 is bent or otherwise deflected by means of cam 90, piezo-resistors R1, R2, R3, R4 are strained resulting in a change in the effective resistance of beam 110.

Accordingly, as disk 40 is turned by spindle 50 so as to increase or decrease the rate of fluid flow through pipe 20, cam 90, as best shown in FIG. 2B, imparts a corresponding bending moment-induced strain upon first portion 112. In the preferred embodiment, first portion 112, at its point of contact with cam 90, is deflected a maximum distance of 0.1 inch. A continuous supply of direct current input voltage is supplied to beam 110. As first portion 112 is strained, the effective resistance of beam 110 is altered, thereby causing a corresponding change in value of the output signal. Upon calibration, a computer 111 may be used to readily convert the measured resistance change in beam 110 into a corresponding position of disk 40 within pipe 20. By determining the position of disk 40 within pipe 20, it may then be determined whether or not and the rate at which fluid is flowing through pipe 20.

Figure 5:
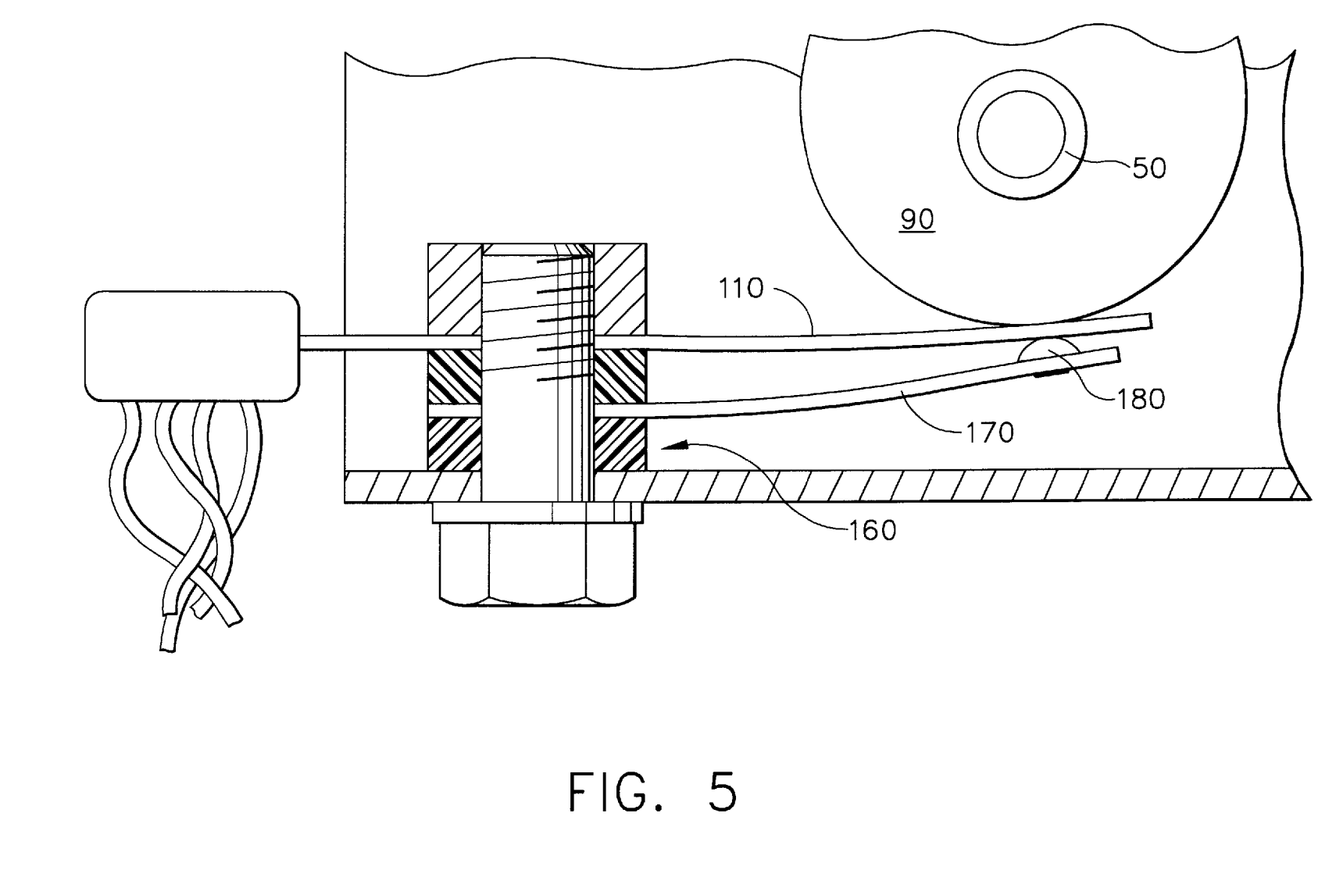
FIG. 5 is a cross-sectional view analogous to that of FIG. 2A of an alternative embodiment of the present invention.

In an alternative embodiment of the present invention, as best shown in FIG. 5, a biasing apparatus, such as a pre-load spring 170, may apply an applicator pad 180 to beam 110 opposite cam 90. Spring 170 and pad 180 function to force abutment of beam 110 against cam 90 throughout the rotation range of cam 90, thereby doubling the output signal from beam 110 and increasing the accuracy of sensing the position of disk 40. This allows operation in the positive and negative deflection regions.

Figure 6:
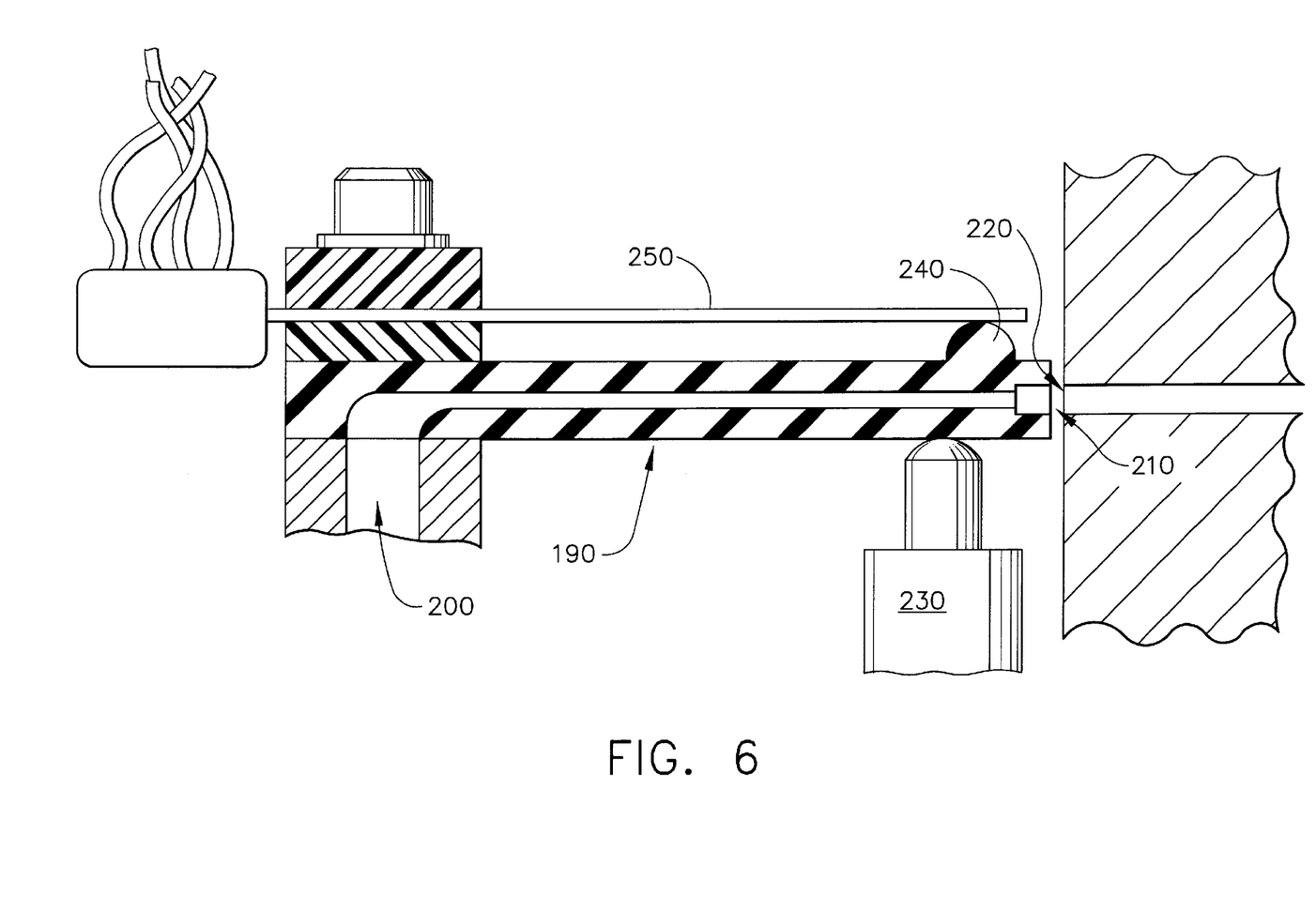
FIG. 6 is a cross-sectional view of an alternative embodiment valve incorporating features of the present invention.

FIG. 6 illustrates the manner in which principles of the present invention may be applied to a conventional flexduct valve 190. In ordinary operation, pressurized fluid enters flexduct valve 190 through an inlet 200 and is exhausted out of flexduct valve 190 through an outlet 210. Pressurization of an accessory (not shown), such as a servo-actuator, is achieved by aligning outlet 210 with a receiver groove 220, thereby enabling the accessory to receive pressured working fluid from groove 220. When it is desired to cease or vary pressurization, and thus operation, of the accessory, a valve driver 230 is used to push flexduct valve outlet 210 out of alignment with receiver groove 220.

By incorporating principles of the present invention, upward pressure applied to flexduct valve 190 by valve driver 230 causes a bumper element 240 attached to flexduct valve 190 to forcefully contact a sensor beam 250 of substantially identical composition and function as that of beam 110 discussed above. Upon such contact, beam 250 is deflected by an amount proportional to displacement of flexduct valve 190. Deflection of beam 250 may then be measured, in a manner similarly described above, as a means of determining the extent of misalignment, and thus absence of fluid communication, between flexduct outlet 210 and receiver groove 220.

Although the invention has been described in terms of the illustrative and alternative embodiments, it will be appreciated by those skilled in the art that various changes and modifications may be made to the illustrative and alternative embodiments without departing from the spirit or scope of the invention. For example, the present invention is not limited to cooperation with valves, but can also be used with actuators or throttles. The function of beam 110 can be adapted by various known mechanical devices such as cams, levers or linkages to convert rotary or linear movement to a small displacement that can be measured within the elastic range of the beam-Wheatstone bridge combination. It is intended that the scope of the invention not be limited in any way to the illustrative and alternative embodiments shown and described but that the invention be limited only by the claims appended hereto.

What is claimed is:

1. A position sensing apparatus operable to sense the position of a movable member operably coupled with an actuating member, the apparatus comprising:

a voltage supply; and a sensor comprising a plurality of piezo-resistive elements coated with, and affixed to a metal substrate by, a ceramic and having a first portion, said sensor electrically communicating with said voltage supply, said sensor operably disposed with the actuating member, said first portion displaceable by the actuating member, said sensor producing at least one output signal corresponding and proportional to displacement of said first portion by said actuating member.

2. An apparatus in accordance with claim 1, comprising:

a computer electrically communicating with said sensor, said computer receiving said at least one output signal from said sensor, said computer converting said at least one output signal into a value representative of a position of the moveable member.

3. An apparatus in accordance with claim 1, wherein:
said voltage supply is a direct current voltage supply.

4. An apparatus in accordance with claim 1, wherein:
said plurality of piezo-resistive elements is connected as a Wheatstone bridge.

5. An apparatus in accordance with claim 1, comprising:
a biasing apparatus operably coupled with said sensor, said biasing apparatus forcing said first portion into continuous abutment with the actuating member.

6. An apparatus in accordance with claim 5, wherein said biasing apparatus forces said first portion into continuous abutment with the actuating member during both a positive and a negative deflection of said first portion.

7. A valve position sensing apparatus operable to sense the position of a valve member operably coupled with an actuating member, the apparatus comprising:
  a direct current voltage supply;
  a sensor comprising a piezo-resistive Wheatstone bridge and having a first portion, said sensor electrically communicating with said voltage supply, said sensor operably disposed with the actuating member, said first portion displaceable by the actuating member, said sensor producing at least one output signal corresponding and proportional to displacement of said first portion by the actuating member; and
  a computer electrically communicating with said sensor, said computer receiving said at least one output signal from said sensor, said computer converting said at least one output signal into a value representative of a position of the valve member.

8. An apparatus in accordance with claim 7, comprising:
a preload spring operably coupled with said first portion, said preload spring forcing said first portion into continuous abutment with the actuating member for positive and negative beam deflection.

9. A method of determining the position of a movable valve member operably coupled with an actuating surface, the method comprising the steps of:
  operably disposing a sensor having a first portion with the actuating surface, whereby movement of the actuating surface displaces said first portion;
  providing a predetermined input voltage to said sensor; and
  measuring an output voltage from said sensor, said output voltage being proportional to the amount said first portion is displaced by the actuating surface.

10. A method in accordance with claim 9, comprising:
computing the position of the valve member from said output voltage measurement.

11. A method in accordance with claim 9, comprising:
biasing said first portion against the actuating surface, whereby said first portion continuously contacts the actuating surface throughout the full range of motion of the actuating surface.

12. A valve for regulating the flow of a fluid comprising:
  a valve member movable between an open and a closed position, said open position permitting downstream flow of the fluid, said closed position preventing downstream flow of the fluid;
  a movable actuating member operably coupled with said valve member, said actuating member moving in a manner corresponding and proportional to movement of said valve member;
  a sensor having a first portion operably coupled with said actuating member, said first portion displaceable by said actuating member, said sensor producing at least one output signal corresponding and proportional to displacement of said first portion by said actuating member; and
  a voltage supply electrically communicating with said sensor.

13. A valve in accordance with claim 12, comprising:
a computer electrically communicating with said sensor, said computer receiving said at least one output signal from said sensor, said computer converting said at least one output signal into a value representative of a position of said valve member.

14. A valve in accordance with claim 12, comprising:
a biasing apparatus operably coupled with said first portion, said biasing apparatus forcing said first portion into continuous abutment with said actuating member.

15. A valve in accordance with claim 12, wherein:
said valve member is a disk.

16. A valve in accordance with claim 12, wherein:
said valve member is a flex duct.

17. A valve in accordance with claim 12, wherein:
said actuating member is a cam.

18. A valve in accordance with claim 12, wherein:
said sensor comprises a piezo-resistive Wheatstone bridge.

19. A valve in accordance with claim 12, wherein:
said voltage supply is a direct current voltage supply.

20. A valve for regulating the flow of a fluid comprising:
  a disk movable between an open and a closed position, said open position permitting downstream flow of the fluid, said closed position preventing downstream flow of the fluid;
  a movable cam operably coupled with said disk, said cam moving in a manner corresponding and proportional to movement of said disk;
  a sensor comprising a piezo-resistive Wheatstone bridge and having a first portion operably coupled with said cam, said first portion displaceable by said cam, said sensor producing at least one output signal corresponding and proportional to displacement of said first portion by said cam;
  a direct current voltage supply electrically communicating with said sensor; and
  a computer electrically communicating with said sensor, said computer receiving said at least one output signal from said sensor, said computer converting said at least one output signal into a value representative of a position of said disk.

21. A valve position sensing device for sensing the position of a valve operably coupled to an actuating member, comprising:
  a flexible beam having a first portion fixedly mounted and a second portion displaceable by the actuating member;
  a piezo-resistive sensing element disposed on said flexible beam and having an electrical resistance that varies in proportion to a displacement of the second portion of said flexible beam by the actuating member,
  wherein the displacement of the second portion of said flexible beam by the actuating member is proportional to the position of the valve.

22. The device of claim 21, further comprising:
  a plurality of input terminals coupled to said piezo-resistive sensing element for receiving an input voltage signal thereon; and a plurality of output terminals coupled to said piezo-resistive sensing element for providing an output voltage signal thereon that varies in direct proportion to the electrical resistance variation of said piezo-resistive sensing element.

23. The device of claim 21, further comprising:
a biasing element coupled to the second portion of said flexible beam and biasing the second portion toward the actuating member.

24. The device of claim 23, wherein said biasing element forces the second portion into continuous abutment with the actuating member during both a positive and a negative deflection of said second portion.

25. The device of claim 22, further comprising:
a processing device coupled to receive the output voltage signal from said piezo-resistive sensing element and output a signal representative of the position of the valve.

26. The device of claim 21, wherein said piezo-resistive sensing element comprises a plurality of piezo-resistors coupled together in a Wheatstone bridge configuration.

27. The device of claim 26, wherein a first half of the piezo-resistors that comprise the Wheatstone bridge are disposed on a top portion of said flexible beam and a second half of the piezo-resistors that comprise the Wheatstone bridge are disposed on a bottom portion thereof.

28. The device of claim 21, wherein:
said flexible beam comprises a metal; and
said piezo-resistive sensing element is coated with, and affixed to said flexible beam by, a ceramic material.

29. A device for sensing the position of a flexduct valve, comprising:
a flexible beam having a first portion fixedly mounted and a second portion displaceable by the flexduct valve;
a piezo-resistive sensing element disposed on said flexible beam and having an electrical resistance that varies in proportion to a displacement of said flexible beam by the flexduct valve,
wherein the displacement of the second portion of said flexible beam by the flexduct valve is proportional to the position of the flexduct valve.

30. The device of claim 29, further comprising:
a plurality of input terminals coupled to said piezo-resistive sensing element for receiving an input voltage signal thereon; and
a plurality of output terminals coupled to said piezo-resistive sensing element for providing an output voltage signal thereon that varies in direct proportion to the electrical resistance variation of said piezo-resistive sensing element.

31. The device of claim 30, further comprising:
a processing device coupled to receive the output voltage signal from said piezo-resistive sensing element and output a signal representative of the position of the valve.

32. The device of claim 29, wherein said piezo-resistive sensing element comprises a plurality of piezo-resistors coupled together in a Wheatstone bridge configuration.

33. The device of claim 32, wherein a first half of the piezo-resistors that comprise the Wheatstone bridge are disposed on a top portion of said flexible beam and a second half of the piezo-resistors that comprise the Wheatstone bridge are disposed on a bottom portion thereof.

34. The device of claim 33, wherein:
said flexible beam comprises a metal; and
said piezo-resistive sensing element is coated with, and affixed to said flexible beam by, a ceramic material.

35. A valve for regulating the fluid flow to an accessory, comprising:
a flexduct having a fixedly mounted first end and a second end operably coupled to a driver element for displacing the second end, and including (i) an inlet port proximate the first end (ii) an outlet port proximate the second end and (iii) an internal flowpath providing fluid communication between the inlet and outlet ports;
a flexible beam having a first portion fixedly mounted proximate the first end of said flexduct and a second portion in contact with, and displaceable by, the second end of said flexduct; and
a piezo-resistive sensing element disposed on said flexible beam and having an electrical resistance that varies in proportion to a displacement of the second portion of said flexible beam by the second end of said flexduct,
wherein the displacement of the second end of said flexduct by the driver element regulates the fluid flow to the accessory, and the displacement of the second portion of said flexible beam is proportional a position of the second end of said flexduct.

36. The device of claim 35, further comprising:
a plurality of input terminals coupled to said piezo-resistive sensing element for receiving an input voltage signal thereon; and
a plurality of output terminals coupled to said piezo-resistive sensing element for providing an output voltage signal thereon that varies in direct proportion to the electrical resistance variation of said piezo-resistive sensing element.

37. The device of claim 35, further comprising:
a processing device coupled to receive the output voltage signal from said piezo-resistive sensing element and output a signal representative of the position of the valve.

38. The device of claim 35, wherein said piezo-resistive sensing element comprises a plurality of piezo-resistors coupled together in a Wheatstone bridge configuration.

39. The device of claim 38, wherein a first half of the piezo-resistors that comprise the Wheatstone bridge are disposed on a top portion of said flexible beam and a second half of the piezo-resistors that comprise the Wheatstone bridge are disposed on a bottom portion thereof.

40. The device of claim 35, wherein:
said flexible beam comprises a metal; and
said piezo-resistive sensing element is coated with, and affixed to said flexible beam by, a ceramic material.

* * * * *